US010350542B2

(12) United States Patent
Dube

(10) Patent No.: US 10,350,542 B2
(45) Date of Patent: Jul. 16, 2019

(54) WET FLUE GAS DESULFURIZATION SYSTEM WITH ZERO WASTE WATER LIQUID DISCHARGE

(71) Applicant: General Electric Technology GmbH, Baden (CH)

(72) Inventor: Sanjay Kumar Dube, Knoxville, TN (US)

(73) Assignee: General Electric Company, Schenectady, NY (US)

(*) Notice: Subject to any disclaimer, the term of this patent is extended or adjusted under 35 U.S.C. 154(b) by 46 days.

(21) Appl. No.: 15/141,878

(22) Filed: Apr. 29, 2016

(65) Prior Publication Data

US 2017/0312683 A1    Nov. 2, 2017

(51) Int. Cl.
*B01D 53/40* (2006.01)
*B01D 53/50* (2006.01)
(Continued)

(52) U.S. Cl.
CPC .......... *B01D 53/40* (2013.01); *B01D 53/501* (2013.01); *B01D 53/507* (2013.01); *B01D 53/68* (2013.01); *B01D 53/96* (2013.01); *C02F 1/048* (2013.01); *C02F 1/06* (2013.01); *B01D 2251/304* (2013.01); *B01D 2251/404* (2013.01);
(Continued)

(58) Field of Classification Search
CPC ...... B01D 53/40; B01D 53/507; B01D 53/68; B01D 53/1475; B01D 53/1456; B01D 53/14; B01D 2257/2045; B01D 2257/2047; B01D 2258/0283
See application file for complete search history.

(56) References Cited

U.S. PATENT DOCUMENTS 3,926,129 A    12/1975    Wall
4,620,856 A    11/1986    Rosenberg et al.
(Continued)

FOREIGN PATENT DOCUMENTS

CN    1478585 A    3/2004
CN    1626271 A    6/2005
(Continued)

OTHER PUBLICATIONS

Extended European Search Report and Opinion issued in connection with corresponding EP Application No. 17168368.3 dated Aug. 28, 2017.

*Primary Examiner* — Cabrena Holecek
(74) *Attorney, Agent, or Firm* — Frank A. Landgraff

(57) ABSTRACT

A system and a method for industrial plant or utility plant flue gas desulfurization, with zero waste water liquid discharge from a wet flue gas desulfurization system utilized therein, are disclosed herein. The wet flue gas desulfurization system is supplied an absorption liquid for contact with a flue gas to absorb flue gas acid gases. Waste water from the wet flue gas desulfurization system is heated under pressure in a heat exchanger to produce heated waste water, which is supplied to a flash vessel to produce steam. The produced steam is supplied to the flue gas upstream of a particulate collection system and the wet flue gas desulfurization system, supplied to the flue gas upstream of the wet flue gas desulfurization system, or supplied to absorption liquid circulated to the wet flue gas desulfurization system.

15 Claims, 4 Drawing Sheets

(51) Int. Cl.
  *B01D 53/68* (2006.01)
  *B01D 53/96* (2006.01)
  *C02F 1/04* (2006.01)
  *C02F 1/06* (2006.01)
(52) U.S. Cl.
  CPC ............... *B01D 2257/2045* (2013.01); *B01D 2257/2047* (2013.01); *B01D 2258/0283* (2013.01)

(56) References Cited

U.S. PATENT DOCUMENTS

| | | | |
|---|---|---|---|
| 5,814,288 A | 9/1998 | Madden et al. | |
| 5,928,412 A | 7/1999 | Bastholm et al. | |
| 6,076,369 A | 6/2000 | Ochi et al. | |
| 7,524,470 B2 | 4/2009 | Barger et al. | |
| 7,625,537 B2 | 12/2009 | Rader et al. | |
| 8,052,763 B2 | 11/2011 | Gallot | |
| 8,388,917 B2 | 3/2013 | Ukai et al. | |
| 8,475,850 B2 | 7/2013 | Tripp et al. | |
| 8,585,869 B1 | 11/2013 | Duesel, Jr. et al. | |
| 8,628,603 B2 | 1/2014 | Martin et al. | |
| 8,715,402 B2 | 5/2014 | Ukai et al. | |
| 8,877,066 B2 | 11/2014 | Cenci et al. | |
| 8,883,107 B2 | 11/2014 | Ukai et al. | |
| 8,961,916 B1 | 2/2015 | Bader | |
| 8,986,428 B2 | 3/2015 | Ukai et al. | |
| 2001/0008620 A1 | 7/2001 | Dohmann et al. | |
| 2004/0253159 A1* | 12/2004 | Hakka ............... B01D 53/1475 423/228 |
| 2005/0000360 A1* | 1/2005 | Mak ................... B01D 53/1475 95/236 |
| 2009/0104098 A1* | 4/2009 | Singh ................. B01D 53/1493 423/224 |
| 2009/0294377 A1 | 12/2009 | Gallot | |
| 2011/0262331 A1 | 10/2011 | Ukai et al. | |
| 2012/0240761 A1 | 9/2012 | Ukai et al. | |
| 2012/0285353 A1 | 11/2012 | Kumar | |
| 2013/0220792 A1 | 8/2013 | Ungerer et al. | |
| 2013/0248121 A1 | 9/2013 | Ukai et al. | |
| 2014/0045131 A1 | 2/2014 | Fukuda et al. | |
| 2014/0202362 A1 | 7/2014 | Ukai et al. | |

FOREIGN PATENT DOCUMENTS

| | | |
|---|---|---|
| DE | 4124844 A1 | 1/1993 |
| DE | 4339072 A1 | 5/1995 |
| DE | 4404284 A1 | 8/1995 |
| EP | 0 040 892 A1 | 12/1981 |
| EP | 1 955 755 A2 | 8/2008 |
| EP | 2 949 376 A1 | 12/2015 |
| JP | S59132921 A | 7/1984 |
| JP | 102817/87 | 5/1987 |
| JP | S63200818 | 8/1988 |
| JP | 198613/90 | 8/1990 |
| JP | 294912/97 | 11/1997 |
| JP | 2012200721 | 10/2012 |
| WO | 2006/030398 A1 | 3/2006 |
| WO | 2010/039785 A1 | 4/2010 |
| WO | 2013/079116 A1 | 6/2013 |
| WO | 2016/064825 A1 | 4/2016 |

\* cited by examiner

WET FLUE GAS DESULFURIZATION SYSTEM WITH ZERO WASTE WATER LIQUID DISCHARGE

TECHNICAL FIELD

The present disclosure relates to a system and a method for industrial plant or utility plant flue gas desulfurization with zero waste water liquid discharge from a wet flue gas desulfurization system utilized therein. More specifically, the present disclosure relates to a system and a method for an industrial plant or utility plant that reduces capital costs associated with wet flue gas desulfurization system waste water purge disposal.

BACKGROUND

Utility and industrial plants such as power plants, electricity generation plants, waste-to-energy facilities, cement kilns, and other facilities firing fossil fuels can be subject to strict limits with respect to air emissions and waste water discharge to help ensure clean and environmentally sound operation thereof. Traditionally, compliance with air emissions limits is achieved through the use of a wet or dry flue gas desulfurization system. Water treatment systems can be utilized to treat waste water discharge from desulfurization systems to comply with applicable waste water regulations. Examples of flue gas cleaning systems and/or waste water treatment systems can be appreciated from International Publication No. WO 2006030398, U.S. Patent Application Publication Nos. 2009/0294377, 2011/0262331, 2012/0240761, 2013/0248121, and 2013/0220792, U.S. Pat. Nos. 6,076,369, 7,524,470, 7,625,537, 8,388,917, and 8,475,850, European Patent Publication No. EP 1 955 755, and Japanese Published Patent Application No. JP 2012200721.

The capital costs of air emissions systems utilizing a wet or dry flue gas desulfurization system along with an associated balance of plant systems, e.g., ducts, fans, bulk material handling systems, etc., can often be relatively expensive, e.g., between $200 to $500 per kilowatt (kW). In retrofit situations, capital costs associated with such systems may render a plant uneconomical. In addition to capital costs, wet and dry flue gas desulfurization systems also involve substantial operating costs associated with reagent consumption, auxiliary power usage, operations staffing, as well as management staffing.

Plants' waste water treatment systems can be configured to neutralize and precipitate heavy metals, perform biological treatment of the waste water, and also filter the waste water to clean the water prior to environmental release thereof. Costs associated with waste water treatment systems can be relatively significant in terms of both capital costs and operating costs. Accordingly, lower cost, more efficient waste water treatment systems are needed.

SUMMARY

The present disclosure provides a system for reducing flue gas acid gas emissions using a wet flue gas desulfurization scrubber tower combined with waste water evaporation to treat the waste water generated in the scrubber tower to thereby achieve zero waste water liquid discharge. The subject system comprises the scrubber tower equipped with a flue gas inlet, a flue gas outlet, an absorbent liquid inlet, and a waste water and solids outlet. A heat exchanger is fluidly connected to the scrubber tower operable for pressurized heating of the waste water generated in the scrubber tower for heated waste water supply to a flash vessel for flash evaporation of the waste water to produce steam. Additionally, a solids collector is operable to collect solids from the flash vessel following the flash evaporation of the waste water. The collected solids may be stored for use elsewhere in the system or otherwise used or disposed of in an environmentally conservative manner.

Further, the present disclosure provides a method of reducing flue gas acid gas emissions using a wet flue gas desulfurization scrubber tower with no waste water liquid discharge therefrom. This method comprises using a scrubber tower supplied with an absorbent liquid for wet flue gas desulfurization of a flue gas supplied thereto, pressurized heating of the waste water generated in the scrubber tower in a heat exchanger fluidly connected to the scrubber tower, transporting the heated waste water to a flash vessel to produce steam, and collecting solids from the produced steam for storage, use or disposal thereof in an environmentally conservative manner.

In summary, the subject system for evaporating waste water and reducing acid gas emissions comprises a wet scrubber tower supplied via an inlet an absorbent liquid dispersed therein for acid gas absorption from a flue gas flowing therethrough comprising one or more acid gases, and a heat exchanger operative for pressurized heating of a waste water produced in the wet scrubber tower to produce heated waste water for supply thereof to a flash vessel to produce steam therefrom. The produced steam may be supplied to a flow of flue gas upstream of a particulate collection system and the wet scrubber tower, supplied to a flow of flue gas upstream of simply the wet scrubber tower, or supplied to absorbent liquid circulated to the wet scrubber tower. As disclosed, the subject heat exchanger is operative at a pressure of about 2 bar to about 20 bar and a temperature of about 100 degrees Celsius to about 200 degrees Celsius. As an option, flue gas may be used to supply heat energy to the subject heat exchanger. As such, flue gas is diverted via ducts to the heat exchanger prior to desulfurization of the flue gas in the wet scrubber tower. The diverted flue gas is preferably of a temperature ranging from about 100 degrees Celsius to about 500 degrees Celsius, or about 250 degrees Celsius to about 350 degrees Celsius to supply necessary heat energy to the heat exchanger. Optionally, as an alternative to or in addition to use of such heat energy from the flue gas, a non-flue gas heat transfer agent may be used to supply heat energy to the heat exchanger. Also, solid material may be added as an anti-scaling agent to the waste water prior to pressurized heating of the waste water, and prior to supply of the heated waste water to a flash vessel for flash evaporation thereof to produce steam. The produced steam may then be supplied to a flow of flue gas upstream of a particulate collection system and the wet scrubber tower, to a flow of flue gas simply upstream of the wet scrubber tower, or to a circulated flow of absorption liquid dispersed within the scrubber tower to achieve zero waste water liquid discharge.

In summary, the subject method for evaporating waste water and reducing acid gas emissions comprises using a scrubber tower with a flow of absorbent liquid for desulfurization of a flue gas flowing therethrough, pressurized heating in a heat exchanger using heat and pressure, waste water collected in the scrubber tower to thereby produce heated waste water, and supplying the heated waste water to a flash vessel to produce steam supplied to a flow of flue gas upstream of a particulate collection system and wet scrubber tower, supplied to a flow of flue gas simply upstream of the wet scrubber tower, or supplied to a circulated flow of absorption liquid dispersed within the wet scrubber tower to achieve zero waste water liquid discharge. The absorbent liquid used in the scrubber tower comprises water and an alkaline reagent. The absorbent liquid used in the scrubber tower may comprise water and lime, hydrated lime, sodium carbonate, trona, or alkaline fly ash. The heat exchanger used in the subject method is operative for pressurized heating of waste water at a pressure of about 2 bar to about 20 bar and a temperature of about 100 degrees Celsius to about 200 degrees Celsius. Also, according to the subject method, heat energy from same system diverted flue gas, from different system flue gas and/or from a non-flue gas heat transfer agent is used in the heat exchanger for pressurized heating of the waste water. The heated waste water is supplied to a flash vessel for flash evaporation to produce steam used as make-up water in the scrubber tower or to humidify flue gas to achieve zero waste water liquid discharge.

The above described system and method, including additional features, is exemplified by the following figures and detailed description.

BRIEF DESCRIPTION OF THE DRAWINGS

Referring now to the figures, example embodiments are provided and illustrated wherein.

Other details, objects, and advantages of the embodiments disclosed herein will become apparent from the following description of the exemplified embodiments illustrated, and exemplified methods associated therewith.

DETAILED DESCRIPTION

Figure 1:
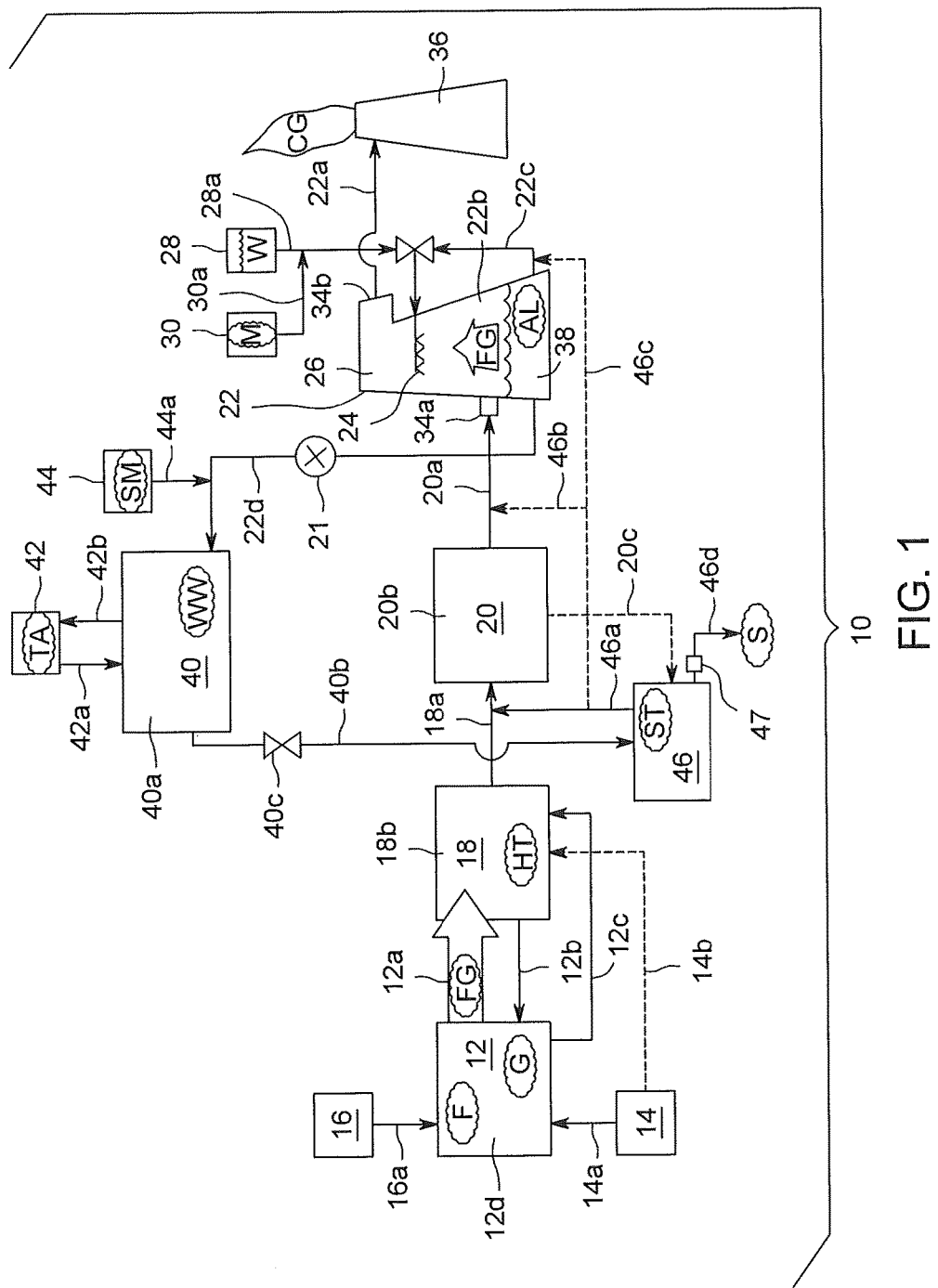
FIG. 1 is a schematic side view of a first exemplified embodiment of a system operable to reduce flue gas acid gas emissions with zero liquid discharge therefrom.

Referring to FIG. 1, disclosed herein is a system 10 such as a power plant or an industrial plant including a combustion unit 12, such as a boiler unit. The combustion unit 12 may be supplied at least one oxygen containing gas G, e.g., air, $O_2$ gas, or gases that include $O_2$ gas, from a gas supply 14 via a fluidly connected supply pipe 14a. Likewise, the combustion unit 12 is supplied a carbonaceous fuel F from a fuel supply 16 via a fluidly connected fuel duct 16a for combustion of the fuel F within the combustion unit 12. The fuel F supplied to combustion unit 12 is preferably a fossil fuel such as for example coal, oil, or natural gas. In addition to steam, flue gas FG is produced upon fuel F combustion within the combustion unit 12. Steam produced by fuel F combustion can be transported, to a turbine (not shown) for use in generating electricity, or put to other uses such as for example district heating, combustion unit 12 pre-heating, or the like. Flue gas FG produced by fuel F combustion comprises acid gases, such as for example but not limited to sulfur oxides and hydrogen chloride, ash, heavy metals and particulates. Flue gas FG produced in the combustion unit 12 flows out of an interior area 12d of the combustion unit 12 through a fluidly connected conduit 12a into an interior area 18b of a fluidly connected air pre-heater 18. Air pre-heater 18 is operable to transfer heat energy from the hot flue gas FG flowing therethrough to a heat transfer fluid HT also flowing therethrough. The heat transfer fluid HT may be steam, steam condensate, pressurized hot water, such a fluid from a waste heat source, or the like. The flow of the heat transfer fluid HT through the air pre-heater 18 is in a direction opposite that of the flow of hot flue gas FG through air pre-heater 18. Heated heat transfer fluid HT is used within system 10, such as for pre-heating needs associated with the operation of combustion unit 12. The heat transfer fluid HT is circulated within system 10, with the heated heat transfer fluid HT flowing out of air pre-heater 18 via fluidly connected duct 12b into combustion unit 12 and the cooled heat transfer fluid HT flowing out of combustion unit 12 via fluidly connected duct 12c into air pre-heater 18. As an optional addition or alternative to using a heat transfer fluid HT in air pre-heater 18, the at least one oxygen containing gas G may be used in air pre-heater 18. As such, air pre-heater 18 is operable to transfer heat energy from the hot flue gas FG flowing therethrough to the at least one oxygen containing gas G, e.g., air, $O_2$ gas, or gases that include $O_2$ gas, from gas supply 14 circulated to air pre-heater 18 via a fluidly connected supply pipe 14b for flow therethrough. Flow of the at least one oxygen containing gas G through the air pre-heater 18 is in a direction opposite that of the flow of hot flue gas FG through air pre-heater 18. Heated at least one oxygen containing gas G is used within combustion unit 12 for added combustion unit efficiency. For such purpose, the at least one oxygen containing gas G once heated within the air pre-heater 18, flows out of air pre-heater 18 via fluidly connected duct 12b into combustion unit 12. The at least one oxygen containing gas G then flows out of combustion unit 12 via fluidly connected conduit 12a into air pre-heater 18 as hot flue gas FG.

From interior area 18b of air pre-heater 18, a reduced temperature flue gas FG flows via fluidly connected duct 18a into a particulate collection system 20. Particulate collection system 20 may be a baghouse or an electrostatic precipitator. Particulate collection system 20 is operative to remove solids S such as fly ash, particulate matter and other such particles from flue gas FG flowing through an interior area 20b thereof. After solids S are removed from the flue gas FG, the flue gas FG flows from interior area 20b of particulate collection system 20 via a fluidly connected duct 20a through inlet 34a of a scrubber tower 22. Scrubber tower 22 is operative for wet flue gas desulfurization of the flue gas FG flowing therethrough. As the flue gas FG flows from inlet 34a upwardly through interior area 22b of scrubber tower 22, an absorbent liquid AL is dispersed from nozzles 24 arranged in an upper area 26 of scrubber tower 22 for a downward flow of absorbent liquid AL therein. Water W from a water supply 28 and absorbent material M such as for example fresh limestone, $CaCO_3$, lime, hydrated lime, sodium carbonate, trona, alkaline fly ash or the like from an absorbent material supply 30 are combined to produce the absorbent liquid AL supplied via fluidly connected piping 28a, 30a to scrubber tower 22. The downward flow of absorbent liquid AL within scrubber tower 22 contacts and mixes with the upwardly flowing flue gas FG illustrated by an arrow, to thereby absorb acid gases such as sulfur oxides therefrom. The resultant cleaned flue gas CG flows from an outlet 34b of scrubber tower 22 to a stack 36 via fluidly connected duct 22a. From stack 36, cleaned flue gas CG is released to the environment. Absorbent liquid AL is collected in a bottom 38 of the scrubber tower 22. The absorbent liquid AL collected in scrubber tower 22 may be circulated via pipe 22c to nozzles 24 for dispersal within scrubber tower 22. Spent absorbent liquid AL collected in scrubber tower 22 is purged as waste water WW. The purged waste water WW is pumped via pump 21 arranged in fluidly connected pipe 22d from the scrubber tower 22 to a heat exchanger 40.

Heat exchanger 40 is operative for pressurized heating of the waste water WW produced in scrubber tower 22. This pressurized heating of the waste water WW within heat exchanger 40 occurs at a pressure of about 2 bar to about 20 bar, or preferably at a pressure of about 3 bar to about 10 bar, and at a temperature of about 100 degrees Celsius to about 200 degrees Celsius, or preferably at a temperature of about 120 degrees Celsius to about 180 degrees Celsius. In operation, waste water WW from scrubber tower 22 is pumped via pump 21 through fluidly connected pipe 22d into interior 40a of heat exchanger 40. Opposite a direction of flow of the waste water WW through heat exchanger 40, is the direction of flow of a heat transfer agent TA such as steam, steam condensate, pressurized hot water, such a fluid from a waste heat source, or the like, through the heat exchanger 40. The heat transfer agent TA may be circulated from a heat source 42 that heats the heat transfer agent TA, to heat exchanger 40 via fluidly connected duct 42a. Within heat exchanger 40, the heat transfer agent TA transfers stored heat energy for waste water WW pressurized heating. Thereafter, the resultant cooled heat transfer agent TA continues circulation from heat exchanger 40 to the heat source 42 via fluidly connected duct 42b.

The waste water WW supplied to the heat exchanger 40 can include solid material such as solid particulates that are suspended within the waste water WW. The waste water WW can also include elements that can precipitate out of the waste water WW as the waste water WW is heated under pressure within the heat exchanger 40. As such, solid material SM from solid material supply 44 may be added via duct 44a to the waste water WW flowing through fluidly connected pipe 22d as needed as an anti-scaling agent to prevent such solid particulates and elements from forming a scale. Other additives may also be added to or mixed into the waste water WW as needed depending on system 10 operating conditions. For example, absorbent material M from absorbent material supply 30 containing an alkaline reagent such as fresh limestone, $CaCO_3$, lime, hydrated lime, sodium carbonate, trona, alkaline fly ash, or the like can be added to the waste water WW. Accordingly, a pre-specified amount of alkaline reagent can be fed to the waste water WW so that the waste water WW is alkaline rich and is in excess of what is required to precipitate insoluble and heavy metal compounds upon waste water WW pressurized heating within heat exchanger 40. Additionally, the presence of excess amounts of alkaline reagent within the absorption liquid AL helps prevent corrosion, and helps reduce pollutant emissions by capturing acid gas elements from flue gas flowing through scrubber tower 22, such as hydrogen chloride (HCl), hydrogen fluoride (HF), sulfur dioxide ($SO_2$), sulfur trioxide ($SO_3$), and sulfuric acid ($H_2SO_4$), to form solid particulates such as calcium sulfite ($CaSO_3$), calcium sulfate ($CaSO_4$), calcium chloride ($CaCl_2$), and calcium fluoride ($CaF_2$).

The heated waste water WW from heat exchanger 40 flows via waste water conduit 40b through valve 40c and into fluidly connected flash vessel 46. Valve 40c is operable for pressure reduction in waste water conduit 40b for expansion and flash evaporation of the waste water WW within flash vessel 46 to produce steam ST therein. Within conduit 40b upstream of valve 40c is a pressure of about 2 bar to about 20 bar, or more preferably, about 3 bar to about 10 bar. Within conduit 40b downstream of valve 40c is a pressure of about atmospheric pressure or slightly higher. Any condensed waste water WW from flash vessel 46, is absorbed into and together with solids S removed via duct 46d from system 10 for environmentally conservative disposal thereof. Optionally, in addition to any solids S from heat exchanger 40, solids S collected in particulate collection system 20 may be transported to flash vessel 46 via fluidly connected duct 20c. As such, solids S from heat exchanger 40 optionally combined with solids S from particulate collection system 20 are periodically removed from flash vessel 46 via a screw or pneumatic conveyor 47 arranged in duct 46d for use elsewhere within system 10, for uses outside system 10, for treatment, or for environmentally conservative disposal thereof.

Following flash evaporation, the steam ST produced in flash vessel 46 may be supplied to the flow of flue gas FG flowing through duct 18a upstream of the particulate collection system 20 via fluidly connected duct 46a to achieve or to contribute to zero system 10 waste water WW liquid discharge. Optionally, as a system 10 alternative or as a system 10 additional feature, the steam ST produced in flash vessel 46 may be supplied to the flow of flue gas FG flowing through duct 20a upstream of scrubber tower 22 via fluidly connected ducts 46a, 46b to achieve or to contribute to zero system 10 waste water WW liquid discharge. Another option, as a system 10 alternative or as a system 10 additional feature, the steam ST produced in flash vessel 46 may be used as make-up water supplied to circulated absorption liquid in pipe 22c via fluidly connected ducts 46a, 46b, 46c to achieve or to contribute to zero system 10 waste water WW liquid discharge.

Disclosed herein is a method of using system 10 for wet flue gas desulfurization with no system 10 waste water WW discharge. The method of using system 10 comprises using a scrubber tower 22 with a flow of absorbent liquid AL for wet flue gas desulfurization of a flue gas FG flowing therethrough, pressure heating and flash evaporating waste water WW collected in the scrubber tower 22 to produce steam ST and a solids S waste stream, and supplying the produced steam ST to a flow of flue gas FG upstream of the particulate collection system 20 and the scrubber tower 22, to a flow of flue gas FG upstream of the scrubber tower 22, or to the circulated flow of absorption liquid AL in pipe 22c dispersed within the scrubber tower 22 to achieve zero system 10 water WW liquid discharge.

Figure 2:
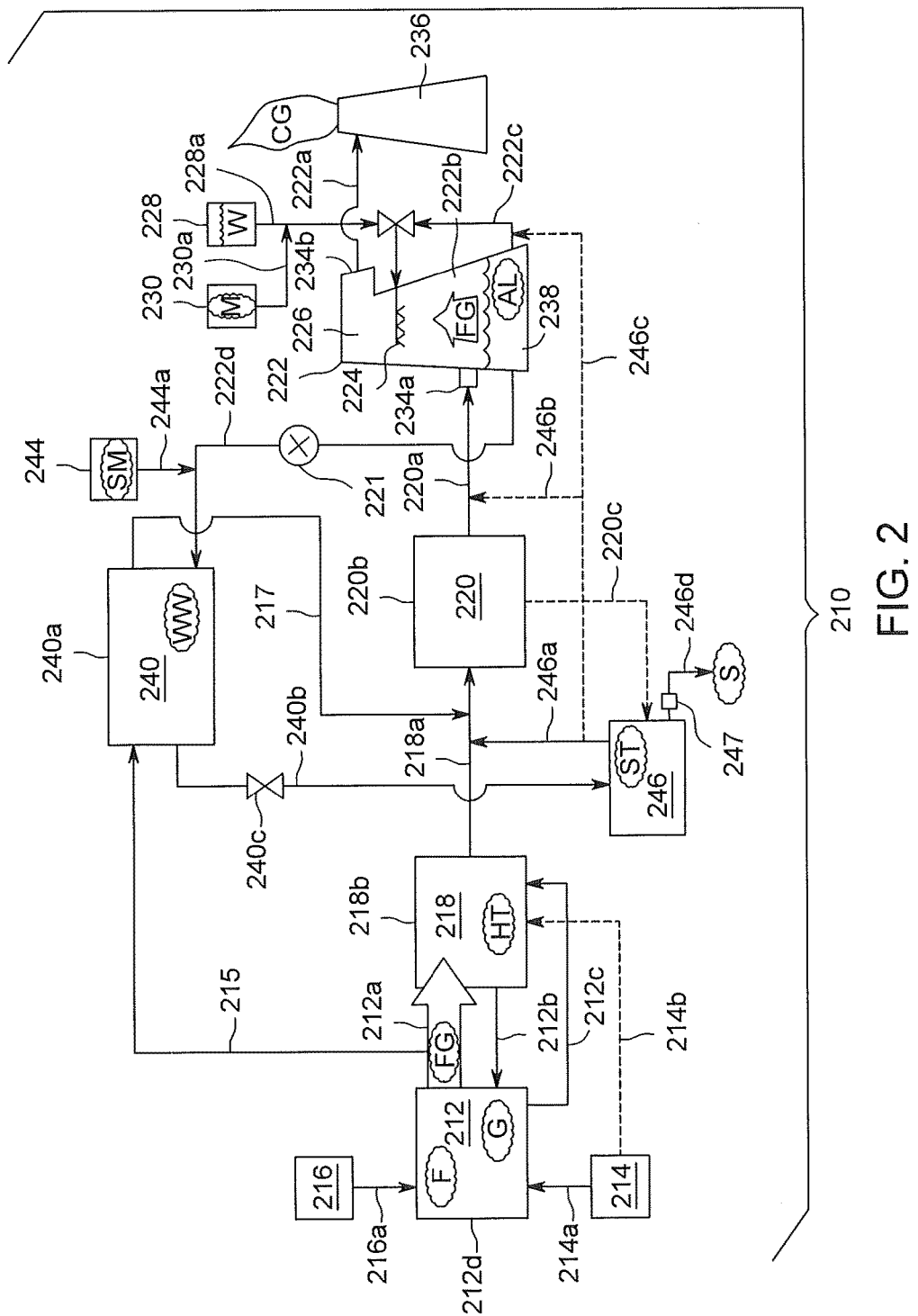
FIG. 2 is a schematic side view of a second exemplified embodiment of a system operable to reduce flue gas acid gas emissions with zero liquid discharge therefrom.

Illustrated in FIG. 2 is another embodiment of the subject system. Many of the features of the embodiment of FIG. 2 may be the same as or similar to the features of the embodiment illustrated in FIG. 1. Accordingly, features of FIG. 2 that may be the same as or similar to those of FIG. 1 are numbered the same as those of FIG. 1 except with the number "2" preceding the same.

Referring now to the example embodiment of FIG. 2, disclosed herein is a system 210 such as a power plant or an industrial plant including a combustion unit 212, such as a boiler unit. The combustion unit 212 may be supplied at least one oxygen containing gas G, e.g., air, $O_2$ gas, or gases that include $O_2$ gas, from a gas supply 214 via a fluidly connected supply pipe 214a. Likewise, the combustion unit 212 is supplied a carbonaceous fuel F from a fuel supply 216 via a fluidly connected fuel duct 216a for combustion of the fuel F within the combustion unit 212. The fuel F supplied to combustion unit 212 is preferably a fossil fuel such as coal, oil, or natural gas. In addition to steam, flue gas FG is produced upon fuel F combustion within the combustion unit 212. Steam produced by fuel F combustion can be transported to a turbine (not shown) for use in generating electricity, or put to other uses such as district heating, combustion unit 212 pre-heating, or the like. Flue gas FG produced by fuel F combustion comprises acid gases, such as for example but not limited to sulfur oxides and hydrogen chloride, ash, heavy metals and particulates. Flue gas FG produced in the combustion unit 212 flows out of an interior area 212d of the combustion unit 212 through a fluidly connected conduit 212a into an interior area 218b of a fluidly connected air pre-heater 218. Air pre-heater 218 is operable to transfer heat energy from the hot flue gas FG flowing therethrough to a heat transfer fluid HT also flowing therethrough. The heat transfer fluid HT may be steam, steam condensate, pressurized hot water, such a fluid from a waste heat source, or the like. The flow of the heat transfer fluid HT through the air pre-heater 218 is in a direction opposite that of the flow of hot flue gas FG through air pre-heater 218. Heated heat transfer fluid HT is used within system 210, such as for pre-heating needs associated with the operation of combustion unit 212. The heat transfer fluid HT is circulated within system 210, with the heated heat transfer fluid HT flowing out of air pre-heater 218 via fluidly connected duct 212b into combustion unit 212 and the cooled heat transfer fluid HT flowing out of combustion unit 212 via fluidly connected duct 212c into air pre-heater 218. As an optional addition or alternative to using a heat transfer fluid HT in air pre-heater 218, the at least one oxygen containing gas G may be used in air pre-heater 218. As such, air pre-heater 218 is operable to transfer heat energy from the hot flue gas FG flowing therethrough to the at least one oxygen containing gas G, e.g., air, $O_2$ gas, or gases that include $O_2$ gas, from gas supply 214 circulated to air pre-heater 218 via a fluidly connected supply pipe 214b for flow therethrough. Flow of the at least one oxygen containing gas G through the air pre-heater 218 is in a direction opposite that of the flow of hot flue gas FG through air pre-heater 218. Heated at least one oxygen containing gas G is used within combustion unit 212 for added combustion unit efficiency. For such purpose, the at least one oxygen containing gas G once heated within the air pre-heater 218, flows out of air pre-heater 218 via fluidly connected duct 212b into combustion unit 212. The at least one oxygen containing gas G then flows out of combustion unit 212 via fluidly connected conduit 212a into air pre-heater 218 as hot flue gas FG.

From interior area 218b of air pre-heater 218, a reduced temperature flue gas FG flows via fluidly connected duct 218a into a particulate collection system 220. Particulate collection system 220 may be a baghouse or an electrostatic precipitator. Particulate collection system 220 is operative to remove solids S such as fly ash, particulate matter and other such particles from flue gas FG flowing through an interior area 220b thereof. After solids S are removed from the flue gas FG, the flue gas FG flows from interior area 220b of particulate collection system 220 via a fluidly connected duct 220a through inlet 234a of a scrubber tower 222. Scrubber tower 222 is operative for wet flue gas desulfurization of the flue gas FG flowing therethrough. As the flue gas FG flows from inlet 234a upwardly through interior area 222b of scrubber tower 222, an absorbent liquid AL is dispersed from nozzles 224 arranged in an upper area 226 of scrubber tower 222 for a downward flow of absorbent liquid AL therein. Water W from a water supply 228 and absorbent material M such as for example fresh limestone, $CaCO_3$, lime, hydrated lime, sodium carbonate, trona, alkaline fly ash or the like from an absorbent material supply 230 are combined to produce the absorbent liquid AL supplied via fluidly connected piping 228a, 230a to scrubber tower 222. The downward flow of absorbent liquid AL within scrubber tower 222 contacts and mixes with the upwardly flowing flue gas FG illustrated by an arrow, to thereby absorb acid gases such as sulfur oxides therefrom. The resultant cleaned flue gas CG flows from an outlet 234b of scrubber tower 222 to a stack 236 via fluidly connected duct 222a. From stack 236, cleaned flue gas CG is released to the environment. Absorbent liquid AL is collected in a bottom 238 of the scrubber tower 222. The absorbent liquid AL collected in scrubber tower 222 may be circulated via pipe 222c to nozzles 224 for dispersal within scrubber tower 222. Spent absorbent liquid AL collected in scrubber tower 222 is purged as waste water WW. The purged waste water WW is pumped via pump 221 arranged in fluidly connected pipe 222d from the scrubber tower 222 to a heat exchanger 240.

Heat exchanger 240 is operative for pressurized heating of the waste water WW produced in scrubber tower 222. This pressurized heating of the waste water WW within heat exchanger 240 occurs at a pressure of about 2 bar to about 20 bar, or preferably at a pressure of about 3 bar to about 10 bar, and at a temperature of about 100 degrees Celsius to about 200 degrees Celsius, or preferably at a temperature of about 120 degrees Celsius to about 180 degrees Celsius. In operation, waste water WW from scrubber tower 222 is pumped via pump 221 through fluidly connected pipe 222d into interior 240a of heat exchanger 240. Opposite a direction of flow of the waste water WW through heat exchanger 240, is the direction of flow of hot flue gas FG through the heat exchanger 240. Hot flue gas FG from combustion unit 212 is circulated via conduit 212a and fluidly connected duct 215 to heat exchanger 240. Within heat exchanger 240, the hot flue gas FG transfers heat energy for pressurized heating of the waste water WW. Thereafter, the resultant cooled flue gas FG continues circulation from heat exchanger 240 to duct 218a upstream of particulate collection system 220 via fluidly connected duct 217.

The waste water WW supplied to the heat exchanger 240 can include solid material such as solid particulates that are suspended within the waste water WW. The waste water WW can also include elements that can precipitate out of the waste water WW as the waste water WW is heated under pressure within the heat exchanger 240. As such, solid material SM from solid material supply 244 may be added via duct 244a to the waste water WW flowing through fluidly connected pipe 222d as needed as an anti-scaling agent to prevent such solid particulates and elements from forming a scale. Other additives may also be added to or mixed into the waste water WW as needed depending on system 210 operating conditions. For example, absorbent material M from absorbent material supply 230 containing an alkaline reagent such as fresh limestone, $CaCO_3$, lime, hydrated lime, sodium carbonate, trona, alkaline fly ash, or the like can be added to the waste water WW. Accordingly, a pre-specified amount of alkaline reagent can be fed to the waste water WW so that the waste water WW is alkaline rich and is in excess of what is required to precipitate insoluble and heavy metal compounds upon waste water WW pressurized heating within heat exchanger 240. Additionally, the presence of excess amounts of alkaline reagent within the absorption liquid AL helps prevent corrosion, and helps reduce pollutant emissions by capturing acid gas elements from flue gas FG flowing through scrubber tower 222, such as hydrogen chloride (HCl), hydrogen fluoride (HF), sulfur dioxide ($SO_2$), sulfur trioxide ($SO_3$), and sulfuric acid ($H_2SO_4$), to form solid particulates such as calcium sulfite (CaSO$_3$), calcium sulfate (CaSO$_4$), calcium chloride (CaCl$_2$), and calcium fluoride (CaF$_2$).

The heated waste water WW from heat exchanger 240 flows via waste water conduit 240b through valve 240c and into fluidly connected flash vessel 246. Valve 240c is operable for pressure reduction in waste water conduit 240b for expansion and flash evaporation of the waste water WW within flash vessel 246 to produce steam ST. Within conduit 240b upstream of valve 240c is a pressure of about 2 bar to about 20 bar, or more preferably, about 3 bar to about 10 bar. Within conduit 240b downstream of valve 240c is a pressure of about atmospheric pressure or slightly higher. Any condensed waste water WW from flash vessel 246 is absorbed into and together with solids S removed via duct 246d from system 210 for environmentally conservative disposal thereof. Optionally, in addition to any solids S from heat exchanger 240, solids S collected in particulate collection system 220 may be transported to flash vessel 246 via fluidly connected duct 220c. As such, solids S from heat exchanger 240 optionally combined with solids S from particulate collection system 220 are periodically removed from flash vessel 246 via a screw or pneumatic conveyor 247 arranged in duct 246d for use elsewhere within system 210, for uses outside system 210, for treatment, or for environmentally conservative disposal thereof.

Following flash evaporation, the steam ST produced in flash vessel 246 may be supplied to the flow of flue gas FG flowing through duct 218a upstream of the particulate collection system 220 via fluidly connected duct 246a to achieve or to contribute to zero system 210 waste water WW liquid discharge. Optionally, as a system 210 alternative or as a system 210 additional feature, the steam ST produced in flash vessel 246 may be supplied to the flow of flue gas FG flowing through duct 220a upstream of scrubber tower 222 via fluidly connected ducts 246a, 246b to achieve or to contribute to zero system 210 waste water WW liquid discharge. Another option, as a system 210 alternative or as a system 210 additional feature, the steam ST produced in flash vessel 246 may be used as make-up water supplied to circulated absorption liquid in pipe 222c via fluidly connected ducts 246a, 246b, 246c to achieve or to contribute to zero system 210 waste water WW liquid discharge.

Disclosed herein is a method of using system 210 for wet flue gas desulfurization with no system 210 waste water WW discharge. The method of using system 210 comprises using a scrubber tower 222 with a flow of absorbent liquid AL for wet flue gas desulfurization of a flue gas FG flowing therethrough, pressure heating and flash evaporating waste water WW collected in the scrubber tower 222 to produce steam ST and a solids S waste stream, and supplying the produced steam ST to a flow of flue gas FG upstream of the particulate collection system 220 and the scrubber tower 222, to a flow of flue gas FG upstream of the scrubber tower 222, or to the circulated flow of absorption liquid AL in pipe 222c dispersed within the scrubber tower 222 to achieve zero system 210 waste water WW liquid discharge.

Figure 3:
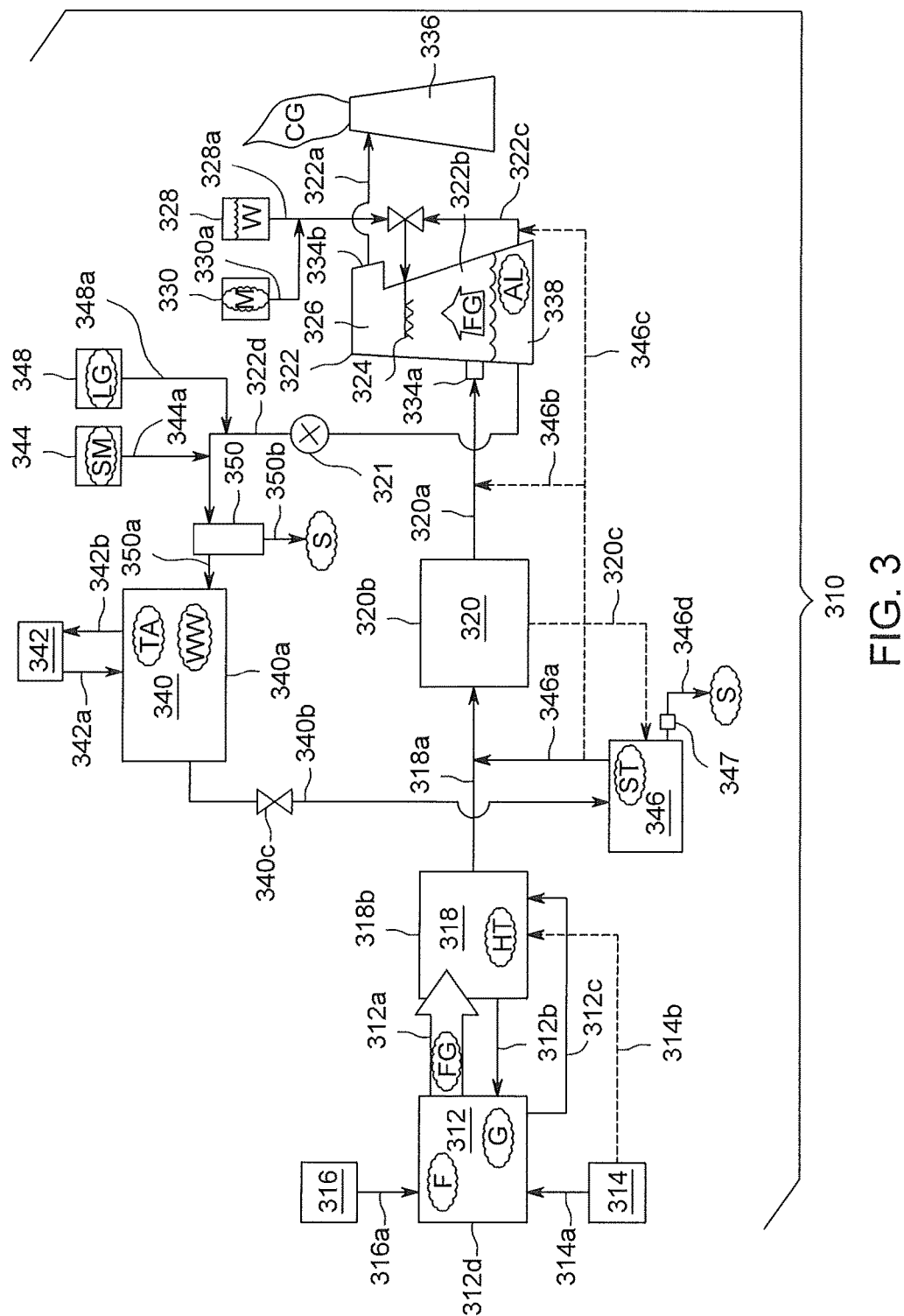
FIG. 3 is a schematic side view of another exemplified embodiment of a system operable to reduce flue gas acid gas emissions with zero liquid discharge therefrom.

Illustrated in FIG. 3 is another embodiment of the subject system. Many of the features of the embodiment of FIG. 3 may be the same as or similar to the features of the embodiment illustrated in FIG. 1. Accordingly, features of FIG. 3 that may be the same as or similar to those of FIG. 1 are numbered the same as those of FIG. 1 except with the number "3" preceding the same.

Referring now to the example embodiment of FIG. 3, disclosed herein is a system 310 such as a power plant or an industrial plant including a combustion unit 312, such as a boiler unit. The combustion unit 312 may be supplied at least one oxygen containing gas G, e.g., air, O$_2$ gas, or gases that include O$_2$ gas, from a gas supply 314 via a fluidly connected supply pipe 314a. Likewise, the combustion unit 312 is supplied a carbonaceous fuel F from a fuel supply 316 via a fluidly connected fuel duct 316a for combustion of the fuel F within the combustion unit 312. The fuel F supplied to combustion unit 312 is preferably a fossil fuel such as coal, oil, or natural gas. In addition to steam, flue gas FG is produced upon fuel F combustion within the combustion unit 312. Steam produced by fuel F combustion can be transported to a turbine (not shown) for use in generating electricity, or put to other uses such as district heating, combustion unit 312 pre-heating, or the like. Flue gas FG produced by fuel F combustion comprises acid gases, such as for example but not limited to sulfur oxides and hydrogen chloride, ash, heavy metals and particulates. Flue gas FG produced in the combustion unit 312 flows out of an interior area 312d of the combustion unit 312 through a fluidly connected conduit 312a into an interior area 318b of a fluidly connected air pre-heater 318. Air pre-heater 318 is operable to transfer heat energy from the hot flue gas FG flowing therethrough to a heat transfer fluid HT also flowing therethrough. The heat transfer fluid HT may be steam, steam condensate, pressurized hot water, such a fluid from a waste heat source, or the like. The flow of the heat transfer fluid HT through the air pre-heater 318 is in a direction opposite that of the flow of hot flue gas FG through air pre-heater 318. Heated heat transfer fluid HT is used within system 310, such as for pre-heating needs associated with the operation of combustion unit 312. The heat transfer fluid HT is circulated within system 310, with the heated heat transfer fluid HT flowing out of air pre-heater 318 via fluidly connected duct 312b into combustion unit 312 and the cooled heat transfer fluid HT flowing out of combustion unit 312 via fluidly connected duct 312c into air pre-heater 318. As an optional addition or alternative to using a heat transfer fluid HT in air pre-heater 318, the at least one oxygen containing gas G may be used in air pre-heater 318. As such, air pre-heater 318 is operable to transfer heat energy from the hot flue gas FG flowing therethrough to the at least one oxygen containing gas G, e.g., air, O$_2$ gas, or gases that include O$_2$ gas, from gas supply 314 circulated to air pre-heater 318 via a fluidly connected supply pipe 314b for flow therethrough. Flow of the at least one oxygen containing gas G through the air pre-heater 318 is in a direction opposite that of the flow of hot flue gas FG through air pre-heater 318. Heated at least one oxygen containing gas G is used within combustion unit 312 for added combustion unit efficiency. For such purpose, the at least one oxygen containing gas G once heated within the air pre-heater 318, flows out of air pre-heater 318 via fluidly connected duct 312b into combustion unit 312. The at least one oxygen containing gas G then flows out of combustion unit 312 via fluidly connected conduit 312a into air pre-heater 318 as hot flue gas FG.

From interior area 318b of air pre-heater 318, a reduced temperature flue gas FG flows via fluidly connected duct 318a into a particulate collection system 320. Particulate collection system 320 may be a baghouse or an electrostatic precipitator. Particulate collection system 320 is operative to remove solids S such as fly ash, particulate matter and other such particles from flue gas FG flowing through an interior area 320b thereof. After solids S are removed from the flue gas FG, the flue gas FG flows from interior area 320b of particulate collection system 320 via a fluidly connected duct 320a through inlet 334a of a scrubber tower 322. Scrubber tower 322 is operative for wet flue gas desulfurization of the flue gas FG flowing therethrough. As the flue gas FG flows from inlet 334a upwardly through interior area 322b of scrubber tower 322, an absorbent liquid AL is dispersed from nozzles 324 arranged in an upper area 326 of scrubber tower 322 for a downward flow of absorbent liquid AL therein. Water W from a water supply 328 and absorbent material M such as for example fresh limestone, $CaCO_3$, lime, hydrated lime, sodium carbonate, trona, alkaline fly ash or the like from an absorbent material supply 330 are combined to produce the absorbent liquid AL supplied via fluidly connected piping 328a, 330a to scrubber tower 322. The downward flow of absorbent liquid AL within scrubber tower 322 contacts and mixes with the upwardly flowing flue gas FG illustrated by an arrow, to thereby absorb acid gases such as sulfur oxides therefrom. The resultant cleaned flue gas CG flows from an outlet 334b of scrubber tower 322 to a stack 336 via fluidly connected duct 322a. From stack 336, cleaned flue gas CG is released to the environment. Absorbent liquid AL is collected in a bottom 338 of the scrubber tower 322. The absorbent liquid AL collected in scrubber tower 322 may be circulated via pipe 322c to nozzles 324 for dispersal within scrubber tower 322. Spent absorbent liquid AL collected in scrubber tower 322 is purged as waste water WW. The purged waste water WW is pumped via pump 321 arranged in fluidly connected pipe 322d from the scrubber tower 322 to a heat exchanger 340.

Heat exchanger 340 is operative for pressurized heating of the waste water WW produced in scrubber tower 322. This pressurized heating of the waste water WW within heat exchanger 340 occurs at a pressure of about 2 bar to about 20 bar, or preferably at a pressure of about 3 bar to about 10 bar, and at a temperature of about 100 degrees Celsius to about 200 degrees Celsius, or preferably at a temperature of about 120 degrees Celsius to about 180 degrees Celsius. In operation, waste water WW from scrubber tower 322 is pumped via pump 321 through fluidly connected pipe 322d into interior 340a of heat exchanger 340. Opposite a direction of flow of the waste water WW through heat exchanger 340, is the direction of flow of a heat transfer agent TA through the heat exchanger 340. The heat transfer agent TA may be steam, steam condensate, pressurized hot water, such a fluid from a waste heat source, or the like. The heat transfer agent TA may be circulated from a heat source 342 that heats the heat transfer agent TA, to heat exchanger 340 via fluidly connected duct 342a. Within heat exchanger 340, the heat transfer agent TA transfers stored heat energy for waste water WW pressurized heating. Thereafter, the resultant cooled heat transfer agent TA continues circulation from heat exchanger 340 to the heat source 342 via fluidly connected duct 342b.

The waste water WW supplied to the heat exchanger 340 can include solid material such as solid particulates that are suspended within the waste water WW. The waste water WW can also include elements that can precipitate out of the waste water WW as the waste water WW is heated under pressure within the heat exchanger 340. As such, solid material SM from solid material supply 344 may be added via duct 344a to the waste water WW flowing through fluidly connected pipe 322d as needed as an anti-scaling agent to prevent such solid particulates and elements from forming a scale. Other additives may also be added to or mixed into the waste water WW as needed depending on the operating conditions. For example, prior to the waste water WW being fed to the heat exchanger 340, lime and/or gypsum LG from a lime and/or gypsum supply 348 may be supplied to waste water pipe 322d via fluidly connected pipe 348a so as to precipitate insoluble and heavy metal compounds upon pressurized heating of the waste water WW. Further, a solids separator 350 may be arranged in waste water pipe 322d to control the level of solids S in the waste water WW. As such, solids S may be removed from the waste water WW using the solids separator 350 with waste water WW flowing out of solids separator 350 and into heat exchanger 340 via fluidly connected pipe 350a. Solids S so removed are used elsewhere within system 310 or discarded via duct 350b in an environmentally conservative manner. As another example, absorbent material M from absorbent material supply 330 containing an alkaline reagent such as fresh limestone, $CaCO_3$, lime, hydrated lime, sodium carbonate, trona, alkaline fly ash or the like can be added to the waste water WW. Accordingly, a pre-specified amount of alkaline reagent can be fed to the waste water WW so that the waste water WW is alkaline rich and is in excess of what is required to precipitate insoluble and heavy metal compounds upon waste water WW pressurized heating within heat exchanger 340. Additionally, the presence of excess amounts of alkaline reagent within the absorption liquid AL helps prevent corrosion, and helps reduce pollutant emissions by capturing acid gas elements from flue gas flowing through scrubber tower 322, such as hydrogen chloride (HCl), hydrogen fluoride (HF), sulfur dioxide ($SO_2$), sulfur trioxide ($SO_3$), and sulfuric acid ($H_2SO_4$), to form solid particulates such as calcium sulfite ($CaSO_3$), calcium sulfate ($CaSO_4$), calcium chloride ($CaCl_2$), and calcium fluoride ($CaF_2$).

The heated waste water WW from heat exchanger 340 flows via waste water conduit 340b through valve 340c and into fluidly connected flash vessel 346. Valve 340c is operable for pressure reduction in waste water conduit 340b for expansion and flash evaporation of the waste water WW within flash vessel 346 to produce steam ST therein. Within conduit 340b upstream of valve 340c is a pressure of about 2 bar to about 20 bar, or more preferably, about 3 bar to about 10 bar. Within conduit 340b downstream of valve 340c is a pressure of about atmospheric pressure or slightly higher. Any condensed waste water WW from flash vessel 346 is absorbed into and together with solids S removed via duct 346d from system 310 for environmentally conservative disposal thereof. Optionally, in addition to any solids S from heat exchanger 340, solids S collected in particulate collection system 320 may be transported to flash vessel 346 via fluidly connected duct 320c. As such, solids S from heat exchanger 340 optionally combined with solids S from particulate collection system 320 are periodically removed from flash vessel 346 via a screw or pneumatic conveyor 347 arranged in duct 346d for use elsewhere within system 310, for uses outside system 310, for treatment, or for environmentally conservative disposal thereof.

Following flash evaporation, the steam ST produced in flash vessel 346 may be supplied to the flow of flue gas FG flowing through duct 318a upstream of the particulate collection system 320 via fluidly connected duct 346a to achieve or to contribute to zero system 310 waste water WW liquid discharge. Optionally, as a system 310 alternative or as a system 310 additional feature, the steam ST produced in flash vessel 346 may be supplied to the flow of flue gas FG flowing through duct 320a upstream of scrubber tower 322 via fluidly connected ducts 346a, 346b to achieve or to contribute to zero system 310 waste water WW liquid discharge. Another option, as a system 310 alternative or as a system 310 additional feature, the steam ST produced in flash vessel 346 may be used as make-up water supplied to circulated absorption liquid in pipe 322c via fluidly connected ducts 346a, 346b, 346c to achieve or to contribute to zero system 310 waste water WW liquid discharge.

Disclosed herein is a method of using system 310 for wet flue gas desulfurization with no system 310 waste water WW discharge. The method of using system 310 comprises using a scrubber tower 322 with a flow of absorbent liquid for wet flue gas desulfurization of a flue gas FG flowing therethrough, pressure heating and flash evaporating waste water WW collected in the scrubber tower 322 to produce steam ST and a solids S waste stream, and supplying the produced steam ST to a flow of flue gas FG upstream of the particulate collection system 320 and the scrubber tower 322, to a flow of flue gas FG upstream of the scrubber tower 322, or to the circulated flow of absorption liquid AL in pipe 322c dispersed within the scrubber tower 322 to achieve zero system 310 waste water WW liquid discharge.

Figure 4:
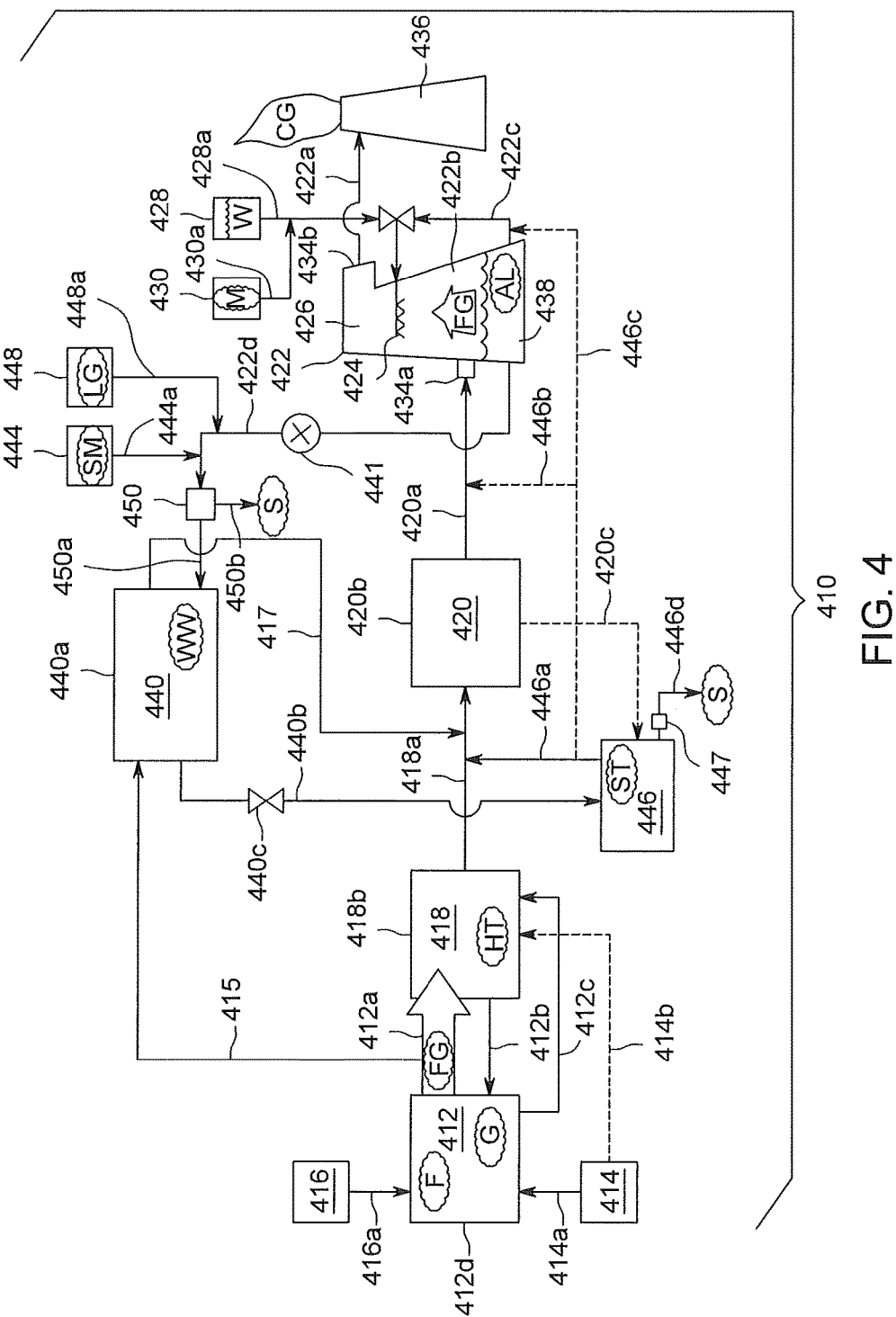
FIG. 4 is a schematic side view of still another exemplified embodiment of a system operable to reduce flue gas acid gas emissions with zero liquid discharge therefrom.

Illustrated in FIG. 4 is another embodiment of the subject system. Many of the features of the embodiment of FIG. 4 may be the same as or similar to the features of the embodiment illustrated in FIG. 1. Accordingly, features of FIG. 4 that may be the same as or similar to those of FIG. 1 are numbered the same as those of FIG. 1 except with the number "4" preceding the same.

Referring now to the example embodiment of FIG. 4, disclosed herein is a system 410 such as a power plant or an industrial plant including a combustion unit 412, such as a boiler unit. The combustion unit 412 can be supplied at least one oxygen containing gas G, e.g., air, $O_2$ gas, or gases that include $O_2$ gas, from a gas supply 414 via a fluidly connected supply pipe 414a. Likewise, the combustion unit 412 is supplied a carbonaceous fuel F from a fuel supply 416 via a fluidly connected fuel duct 416a for combustion of the fuel F within the combustion unit 412. The fuel F supplied to combustion unit 412 is preferably a fossil fuel such as coal, oil, or natural gas. In addition to steam, flue gas FG is produced upon fuel F combustion within the combustion unit 412. Steam produced by fuel F combustion can be transported to a turbine (not shown) for use in generating electricity, or put to other uses such as district heating, combustion unit 412 pre-heating, or the like. Flue gas FG produced by fuel F combustion comprises acid gases, such as for example but not limited to sulfur oxides and hydrogen chloride, ash, heavy metals and particulates. Flue gas FG produced in the combustion unit 412 flows out of an interior area 412d of the combustion unit 412 through a fluidly connected conduit 412a into an interior area 418b of a fluidly connected air pre-heater 418. Air pre-heater 418 is operable to transfer heat energy from the hot flue gas FG flowing therethrough to a heat transfer fluid HT also flowing therethrough. The heat transfer fluid HT may be steam, steam condensate, pressurized hot water, such a fluid from a waste heat source, or the like. The flow of the heat transfer fluid HT through the air pre-heater 418 is in a direction opposite that of the flow of hot flue gas FG through air pre-heater 418. Heated heat transfer fluid HT is used within system 410, such as for pre-heating needs associated with the operation of combustion unit 412. The heat transfer fluid HT is circulated within system 410, with the heated heat transfer fluid HT flowing out of air pre-heater 418 via fluidly connected duct 412b into combustion unit 412 and the cooled heat transfer fluid HT flowing out of combustion unit 412 via fluidly connected duct 412c into air pre-heater 418. As an optional addition or alternative to using a heat transfer fluid HT in air pre-heater 418, the at least one oxygen containing gas G may be used in air pre-heater 418. As such, air pre-heater 418 is operable to transfer heat energy from the hot flue gas FG flowing therethrough to the at least one oxygen containing gas G, e.g., air, $O_2$ gas, or gases that include $O_2$ gas, from gas supply 414 circulated to air pre-heater 418 via a fluidly connected supply pipe 414b for flow therethrough. Flow of the at least one oxygen containing gas G through the air pre-heater 418 is in a direction opposite that of the flow of hot flue gas FG through air pre-heater 418. Heated at least one oxygen containing gas G is used within combustion unit 412 for added combustion unit 412 efficiency. For such purpose, the at least one oxygen containing gas G once heated within the air pre-heater 418, flows out of air pre-heater 418 via fluidly connected duct 412b into combustion unit 412. The at least one oxygen containing gas G then flows out of combustion unit 412 via fluidly connected conduit 412a into air pre-heater 418 as hot flue gas FG.

From interior area 418b of air pre-heater 418, a reduced temperature flue gas FG flows via fluidly connected duct 418a into a particulate collection system 420. Particulate collection system 420 may be a baghouse or an electrostatic precipitator. Particulate collection system 420 is operative to remove solids S such as fly ash, particulate matter and other such particles from flue gas FG flowing through an interior area 420b thereof. After solids S are removed from the flue gas FG, the flue gas FG flows from interior area 420b of particulate collection system 420 via a fluidly connected duct 420a through inlet 434a of a scrubber tower 422. Scrubber tower 422 is operative for wet flue gas desulfurization of the flue gas FG flowing therethrough. As the flue gas FG flows from inlet 434a upwardly through interior area 422b of scrubber tower 422, an absorbent liquid AL is dispersed from nozzles 424 arranged in an upper area 426 of scrubber tower 422 for a downward flow of absorbent liquid AL therein. Water W from a water supply 428 and absorbent material M such as for example fresh limestone, $CaCO_3$, lime, hydrated lime, sodium carbonate, trona, alkaline fly ash or the like from an absorbent material supply 430 are combined to produce the absorbent liquid AL supplied via fluidly connected piping 428a, 430a to scrubber tower 422. The downward flow of absorbent liquid AL within scrubber tower 422 contacts and mixes with the upwardly flowing flue gas FG illustrated by an arrow, to thereby absorb acid gases such as sulfur oxides therefrom. The resultant cleaned flue gas CG flows from an outlet 434b of scrubber tower 422 to a stack 436 via fluidly connected duct 422a. From stack 436, cleaned flue gas CG is released to the environment. Absorbent liquid AL is collected in a bottom 438 of the scrubber tower 422. The absorbent liquid AL collected in scrubber tower 422 may be circulated via pipe 422c to nozzles 424 for dispersal within scrubber tower 422. Spent absorbent liquid AL collected in scrubber tower 422 is purged as waste water WW. The purged waste water WW is pumped via pump 441 arranged in fluidly connected pipe 422d from the scrubber tower 422 to a heat exchanger 440.

Heat exchanger 440 is operative for pressurized heating of the waste water WW produced in scrubber tower 422. This pressurized heating of the waste water WW within heat exchanger 440 occurs at a pressure of about 2 bar to about 20 bar, or preferably at a pressure of about 3 bar to about 10 bar, and at a temperature of about 100 degrees Celsius to about 200 degrees Celsius, or preferably at a temperature of about 120 degrees Celsius to about 180 degrees Celsius. In operation, waste water WW from scrubber tower 422 is pumped via pump 421 through fluidly connected pipe 422d into interior 440a of heat exchanger 440. Opposite a direction of flow of the waste water WW through heat exchanger 440, is the direction of flow of hot flue gas FG through the heat exchanger 440. Hot flue gas FG from combustion unit 412 is circulated via conduit 412a and fluidly connected duct 415 to heat exchanger 440. Within heat exchanger 440, the hot flue gas FG transfers heat energy for pressurized heating of the waste water WW. Thereafter, the resultant cooled flue gas FG continues circulation from heat exchanger 440 to duct 418a upstream of particulate collection system 420 via fluidly connected duct 417.

The waste water WW supplied to the heat exchanger 440 can include solid material such as solid particulates that are suspended within the waste water WW. The waste water WW can also include elements that can precipitate out of the waste water WW as the waste water WW is heated under pressure within the heat exchanger 440. As such, solid material SM from solid material supply 444 may be added via duct 444a to the waste water WW flowing through fluidly connected pipe 422d as needed as an anti-scaling agent to prevent such solid particulates and elements from forming a scale. Other additives may also be added to or mixed into the waste water WW as needed depending on the operating conditions. For example, prior to the waste water VVW being fed to the heat exchanger 440, lime and/or gypsum LG from a lime and/or gypsum supply 448 may be supplied to waste water pipe 422d via fluidly connected pipe 448a so as to precipitate insoluble and heavy metal compounds upon pressurized heating of the waste water WW. Further, a solids separator 450 may be arranged in waste water pipe 422d to control the level of solids S in the waste water WW. As such, solids S may be removed from the waste water WW using the solids separator 450 with waste water WW flowing out of solids separator 450 and into heat exchanger 440 via fluidly connected pipe 450a. Solids S so removed are used elsewhere within system 410 or discarded via duct 450b in an environmentally conservative manner. As another example, absorbent material M from absorbent material supply 430 containing an alkaline reagent such as fresh limestone, $CaCO_3$, lime, hydrated lime, sodium carbonate, trona, alkaline fly ash or the like can be added to the waste water WW. Accordingly, a pre-specified amount of alkaline reagent can be fed to the waste water WW so that the waste water WW is alkaline rich and is in excess of what is required to precipitate insoluble and heavy metal compounds upon waste water WW pressurized heating within heat exchanger 440. Additionally, the presence of excess amounts of alkaline reagent within the absorption liquid AL helps prevent corrosion, and helps reduce pollutant emissions by capturing acid gas elements from flue gas flowing through scrubber tower 422, such as hydrogen chloride (HCl), hydrogen fluoride (HF), sulfur dioxide ($SO_2$), sulfur trioxide ($SO_3$), and sulfuric acid ($H_2SO_4$), to form solid particulates such as calcium sulfite ($CaSO_3$), calcium sulfate ($CaSO_4$), calcium chloride ($CaCl_2$), and calcium fluoride ($CaF_2$).

The heated waste water WW from heat exchanger 440 flows via waste water conduit 440b through valve 440c and into fluidly connected flash vessel 446. Valve 440c is operable for pressure reduction in waste water conduit 440b for expansion and flash evaporation of the waste water WW within flash vessel 446 to produce steam ST therein. Within conduit 440b upstream of valve 440c is a pressure of about 2 bar to about 20 bar, or more preferably, about 3 bar to about 10 bar. Within conduit 440b downstream of valve 440c is a pressure of about atmospheric pressure or slightly higher. Any condensed waste water WW from flash vessel 446 is absorbed into and together with solids S removed via duct 446d from system 410 for environmentally conservative disposal thereof. Optionally, in addition to any solids S from heat exchanger 440, solids S collected in particulate collection system 420 may be transported to flash vessel 446 via fluidly connected duct 420c. As such, solids S from heat exchanger 440 optionally combined with solids S from particulate collection system 420 are periodically removed from flash vessel 446 via a screw or pneumatic conveyor 447 arranged in duct 446d for use elsewhere within system 410, for uses outside system 410, for treatment, or for environmentally conservative disposal thereof.

Following flash evaporation, the steam ST produced in flash vessel 446 may be supplied to the flow of flue gas FG flowing through duct 418a upstream of the particulate collection system 420 via fluidly connected duct 446a to achieve or to contribute to zero system 410 waste water WW liquid discharge. Optionally, as a system 410 alternative or as a system 410 additional feature, the steam ST produced in flash vessel 446 may be supplied to the flow of flue gas FG flowing through duct 420a upstream of scrubber tower 422 via fluidly connected ducts 446a, 446b to achieve or to contribute to zero system 410 waste water WW liquid discharge. Another option, as a system 410 alternative or as a system 410 additional feature, the steam ST produced in flash vessel 446 may be used as make-up water supplied to circulated absorption liquid in pipe 422c via fluidly connected ducts 446a, 446b, 446c to achieve or to contribute to zero system 410 waste water WW liquid discharge.

Disclosed herein is a method of using system 410 for wet flue gas desulfurization with no system 410 waste water WW discharge. The method of using system 410 comprises using a scrubber tower 422 with a flow of absorbent liquid AL for wet flue gas desulfurization of a flue gas FG flowing therethrough, pressure heating and flash evaporating waste water WW collected in the scrubber tower 422 to produce steam ST and a solids S waste stream, and supplying the produced steam ST to a flow of flue gas FG upstream of the particulate collection system 420 and the scrubber tower 422, to a flow of flue gas FG upstream of the scrubber tower 422, or to the circulated flow of absorption liquid AL in pipe 422c dispersed within the scrubber tower 422 to achieve zero system 410 waste water WW liquid discharge.

In summary, the subject system 10, 210, 310, 410 as disclosed for evaporating waste water WW and reducing acid gas emissions comprises a wet scrubber tower 22, 222, 322, 422 supplied via nozzles 24, 224, 324, 424 an absorbent liquid AL dispersed therein for acid gas absorption from a flue gas FG flowing therethrough comprising one or more acid gases, a heat exchanger 40, 240, 340, 440 operative for pressurized heating of waste water WW produced in the wet scrubber tower 22, 222, 322, 422 to produce heated waste water WW, and a flash vessel 46, 246, 346, 446 operative for flash evaporation of the heated waste water WW to produce steam ST supplied to a flow of flue gas FG upstream of the particulate collection system 20, 220, 320, 420 and wet scrubber tower 22, 222, 322, 422, to a flow of flue gas FG upstream of the wet scrubber tower 22, 222, 322, 422, or supplied to absorbent liquid AL circulated in pipe 22c, 222c, 322c, 422c to the wet scrubber tower 22, 222, 322, 422 to achieve zero system 10, 210, 310, 410 waste water WW liquid discharge. As disclosed, the subject heat exchanger 40, 240, 340, 440 is operative at a pressure of about 2 bar to about 20 bar, and a temperature of about 100 degrees Celsius to about 200 degrees Celsius. As an option, flue gas FG from system 10, 210, 310, 410, flue gas FG from a different system and/or a non-flue gas heat transfer agent may be used to supply heat energy to the subject heat exchanger 240, 440. As such, flue gas FG may be diverted via ducts 215, 415 to the heat exchanger 240, 440 prior to desulfurization of the flue gas FG in the wet scrubber tower 222, 422. The diverted flue gas FG is preferably of a temperature ranging from about 100 degrees Celsius to about 500 degrees Celsius, or about 250 degrees Celsius to about 350 degrees Celsius to supply necessary heat energy to the heat exchanger 240, 440. As another option, a heat transfer agent TA may be used to supply heat energy to the heat exchanger 40, 340. Solid material SM from a solid material supply 44, 244, 344, 444 may be added as an anti-scaling agent to the waste water WW prior to heating of the waste water WW in the heat exchanger 40, 240, 340, 440.

In summary, the subject method as disclosed for evaporating waste water WW and reducing acid gas emissions, comprises using a wet scrubber tower 22, 222, 322, 422 with a flow of absorbent liquid AL for desulfurization of a flue gas FG flowing therethrough, pressurized heating in a heat exchanger 40, 240, 340, 440 using heat and pressure, waste water WW collected in the wet scrubber tower 22, 222, 322, 422 to thereby produce heated waste water WW, and supplying the heated waste water WW to a flash vessel 46, 246, 346, 446 to produced steam ST supplied to a flow of flue gas FG upstream of the particulate collection system 20, 220, 320, 420 and wet scrubber tower 22, 222, 322, 422, to a flow of flue gas FG upstream of the wet scrubber tower 22, 222, 322, 422, or to the circulated flow of absorption liquid AL in pipe 22c, 222c, 322c, 422c dispersed within the wet scrubber tower 22, 222, 322, 422 to achieve zero system 10, 210, 310, 410 waste water WW liquid discharge. The absorbent liquid AL used in the wet scrubber tower 22, 222, 322, 422 comprises water and an alkaline reagent. The absorbent liquid AL used in the wet scrubber tower 22, 222, 322, 422 may comprise water and fresh limestone, lime, hydrated lime, sodium carbonate, trona, alkaline fly ash or the like. The heat exchanger 40, 240, 340, 440 used in the subject method is operative for pressurized heating of waste water WW at a pressure of about 2 bar to about 20 bar, and a temperature of about 100 degrees Celsius to about 200 degrees Celsius. Also, according to the subject method, heat energy from diverted flue gas FG may be used in the heat exchanger 240, 440 for pressurized heating of waste water WW. The heated waste water WW flows to a flash vessel 46, 246, 346, 446 to produce steam ST used as make-up water in the wet scrubber tower 22, 222, 322, 422 or to humidify flue gas FG.

It should be appreciated that various changes can be made to embodiments of the subject system exemplified for evaporating waste water WW and reducing acid gas emissions to account for different system and method design criteria. For instance, the size, shape or configuration of conduits for transporting different fluids to and from different components of the system can be any of a number of suitable shapes, sizes, or configurations and include any of a number of different conduit elements such as vessels, valves, pipes, tubes, tanks, ducts or sensors. The temperatures and/or pressures at which the flue gas FG, waste water WW, and other fluid flows are to be maintained at or kept can also be any of a number of suitable ranges to meet a particular set of design objectives.

While the subject system and method have been described with reference to various exemplified embodiments, it will be understood by those skilled in the art that various changes can be made and equivalents can be substituted for elements thereof without departing from the scope thereof. In addition, many modifications can be made to adapt a particular situation or material to the subject teachings without departing from the essential scope thereof. Therefore, it is intended that the subject system and method not be limited to the particular embodiments disclosed as the best modes contemplated, but to include all embodiments falling within the scope of the appended claims.

What is claimed is:

1. A system for evaporating waste water and reducing acid gas emissions, comprising:
    a particulate collection system;
    a desulfurization system comprising a scrubber tower, an alkaline absorbent material supply, and a water supply, the scrubber tower comprising an inlet, nozzles, an outlet, and a bottom, for absorbent liquid dispersal via the nozzles within the scrubber tower for acid gas absorption from a flue gas comprising one or more acid gases flowing through the scrubber tower via the inlet and the outlet;
    a heat exchanger operative for pressurized heating of a waste water produced in the scrubber tower and collected in the bottom of the scrubber tower, to produce heated waste water; and
    a flash vessel operative for flash evaporation of the heated waste water to produce steam supplied via one or more ducts to flue gas flowing through a fluidly connected first duct upstream of the particulate collection system and the scrubber tower, supplied via the one or more ducts to flue gas flowing through a fluidly connected second duct upstream of the scrubber tower, or supplied via the one or more ducts to a fluidly connected pipe with an absorbent liquid circulated to the scrubber tower.

2. The system of claim 1, wherein the heat exchanger is operative at a pressure of about 2 bar to about 20 bar, and a temperature of about 100 degrees Celsius to about 200 degrees Celsius.

3. The system of claim 1, wherein the heat exchanger is operative at a pressure of about 3 bar to about 10 bar, and a temperature of about 120 degrees Celsius to about 180 degrees Celsius.

4. The system of claim 1, wherein flue gas supplies heat energy to the heat exchanger.

5. The system of claim 1, wherein flue gas is diverted via ducts to the heat exchanger prior to desulfurization thereof in the scrubber tower.

6. The system of claim 1, wherein a heat transfer agent supplies heat energy to the heat exchanger.

7. The system of claim 1, wherein solid material is added to the waste water prior to pressurized heating of the waste water.

8. The system of claim 1, wherein flue gas having a temperature of about 100 degrees Celsius to about 500 degrees Celsius supplies heat energy to the heat exchanger.

9. A method for evaporating waste water and reducing acid gas emissions, comprising:
    using a desulfurization system comprising a scrubber tower, an alkaline absorbent material supply and a water supply, the scrubber tower comprising an inlet, nozzles, an outlet, and a bottom, for absorbent liquid dispersal via the nozzles within the scrubber tower for desulfurization of a flue gas flowing through the scrubber tower via the inlet and the outlet;
    pressurized heating in a heat exchanger using heat and pressure, waste water produced in the scrubber tower and collected in the bottom of the scrubber tower to produce heated waste water;
    supplying the heated waste water to a flash vessel operative for flash evaporation of the heated waste water to produce steam; and
    supplying the produced steam via one or more ducts to a flow of flue gas in a fluidly connected first duct upstream of a particulate collection system and the scrubber tower, to a flow of flue gas in a fluidly connected second duct upstream of the scrubber tower, or to a fluidly connected pipe with a circulated flow of absorption liquid dispersed within the scrubber tower.

10. The method of claim 9, wherein the absorbent liquid comprises water and an alkaline reagent supplied via the alkaline absorbent material supply.

11. The method of claim 9, wherein the absorbent liquid comprises water and fresh limestone, lime, hydrated lime, sodium carbonate, trona, or alkaline fly ash.

12. The method of claim 9, wherein the heat exchanger is operative for pressurized heating of waste water at a pressure of about 2 bar to about 20 bar, and a temperature of about 100 degrees Celsius to about 200 degrees Celsius.

13. The method of claim 9, wherein the heat exchanger is operative at a pressure of about 3 bar to about 10 bar, and a temperature of about 120 degrees Celsius to about 180 degrees Celsius.

14. The method of claim 9, wherein heat energy from flue gas is used in the heat exchanger for pressurized heating of waste water.

15. The method of claim 9, wherein steam produced in the flash vessel is used as make-up water in the scrubber tower.

* * * * *